US010242359B2

(12) United States Patent
Bostick et al.

(10) Patent No.: US 10,242,359 B2
(45) Date of Patent: Mar. 26, 2019

(54) MINING UNSTRUCTURED ONLINE CONTENT FOR AUTOMATED CURRENCY VALUE CONVERSION

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 14/661,055

(22) Filed: Mar. 18, 2015

(65) Prior Publication Data
US 2016/0275496 A1 Sep. 22, 2016

(51) Int. Cl.
G06Q 20/38 (2012.01)
G06Q 20/14 (2012.01)
(Continued)

(52) U.S. Cl.
CPC ............ G06Q 20/381 (2013.01); G01S 19/14 (2013.01); G06F 17/2264 (2013.01); G06F 17/278 (2013.01); G06Q 20/145 (2013.01)

(58) Field of Classification Search
CPC combination set(s) only.
See application file for complete search history.

(56) References Cited

U.S. PATENT DOCUMENTS 8,412,603 B2    4/2013  Santhosh et al.
8,639,581 B1 *  1/2014  Yalamanchi ....... G06Q 30/0283
                                                    705/26.1
(Continued)

OTHER PUBLICATIONS

"Disaggregated End-Use Energy Sensing for the Smart Grid" Authors: Jon Froehlich, Eric Larson, Sidhant Gupta, Gabe Cohn, Matthew S. Reynolds, and Shwetak N. Patel "IEEE Pervasive Computing, Special Issue on Smart Energy Systems, to appear in Jan.-Mar. 2011 issue".*

(Continued)

Primary Examiner — Ryan D Donlon
Assistant Examiner — Tony P Kanaan
(74) Attorney, Agent, or Firm — Law Office of Jim Boice

(57) ABSTRACT

A method and/or computer program product generates and displays a secondary currency value derived from an initial currency value that is presented in an electronic publication on an electronic display. An electronic publication, which is an unstructured text document that includes an initial currency value that is based on a monetary currency, is received. The unstructured text document is data mined to determine a temporal context of the initial currency value. The temporal context describes a first time period during which the initial currency value was utilized in the electronic publication. The initial currency value is extracted from the electronic publication and converted into a secondary currency value that is based on the monetary currency. The secondary currency value, which is derived for a second time period, is displayed in the electronic publication while the electronic publication is being displayed on an electronic display.

18 Claims, 3 Drawing Sheets

(51) Int. Cl.
*G01S 19/14* (2010.01)
*G06F 17/22* (2006.01)
*G06F 17/27* (2006.01)

(56) References Cited

U.S. PATENT DOCUMENTS

| | | | |
|---|---|---|---|
| 9,727,753 B2* | 8/2017 | Taylor | G06F 21/64 |
| 2009/0083619 A1* | 3/2009 | Davis | G06F 17/30014 |
| | | | 715/234 |
| 2009/0171802 A1* | 7/2009 | Raygoza | G06Q 20/12 |
| | | | 705/26.1 |
| 2011/0161333 A1 | 6/2011 | Langseth et al. | |
| 2013/0110564 A1* | 5/2013 | Hyser | G06Q 10/06 |
| | | | 705/7.11 |
| 2013/0332862 A1* | 12/2013 | Mirra | G06Q 40/06 |
| | | | 715/760 |

OTHER PUBLICATIONS

Anonymous, "Recommending Updates for Structured Entities", IP.com, IPCOM000226947, Apr. 25, 2013, pp. 1-8.
Anonymous, "Unique Identifiers in Automated Processing of Unstructured Text," IP.com, IPCOM000236223, Apr. 12, 2014, pp. 1-7.
Anonymous, "Dynamic Converter", Dynamic Converter, dynamic-converter.com, retrieved Oct. 6, 2014, pp. 1-4.

* cited by examiner

MINING UNSTRUCTURED ONLINE CONTENT FOR AUTOMATED CURRENCY VALUE CONVERSION

BACKGROUND

The present disclosure relates to the field of computers, and specifically to computers that display electronic publications. Still more particularly, the present disclosure relates to electronic publications that include currency values displayed therein.

SUMMARY

In an embodiment of the present invention, a method and/or computer program product generates and displays a secondary currency value derived from an initial currency value that is presented in an electronic publication on an electronic display. An electronic publication is received. The electronic publication is an unstructured text document that includes a representation of an initial currency value that is based on a monetary currency. The unstructured text document is data mined to determine a temporal context of the initial currency value. The temporal context describes a first time period during which the initial currency value was utilized in the electronic publication. The initial currency value is extracted from the electronic publication and converted into a secondary currency value that is based on the monetary currency. The secondary currency value, which is derived for a second time period that is different from the first time period, is displayed in the electronic publication while the electronic publication is being displayed on an electronic display.

In an embodiment of the present invention, a device includes a display, a transceiver, and one or more processors. The display displays an electronic publication, which is an unstructured text document that includes a representation of an initial currency value that is based on a monetary currency. The one or more processors data mine the unstructured text document to determine a temporal context of the initial currency value. The temporal context describes a first time period during which the initial currency value was utilized in the electronic publication. The one or more processors extract the initial currency value from the electronic publication, and convert the initial currency value into a secondary currency value that is based on the monetary currency. The secondary currency value is derived for a second time period that is different from the first time period. The transceiver receives a signal from a sensor on equipment. The sensor detects a load level on the equipment, and the signal describes the load level on the equipment. The one or more processors adjust the usage fee to create an adjusted usage fee that is based on the load level. The one or more processors adjust the secondary currency value to create an adjusted secondary currency value that is based on the adjusted usage fee. The display displays the adjusted secondary currency value in the electronic publication.

DETAILED DESCRIPTION

Figure 1:
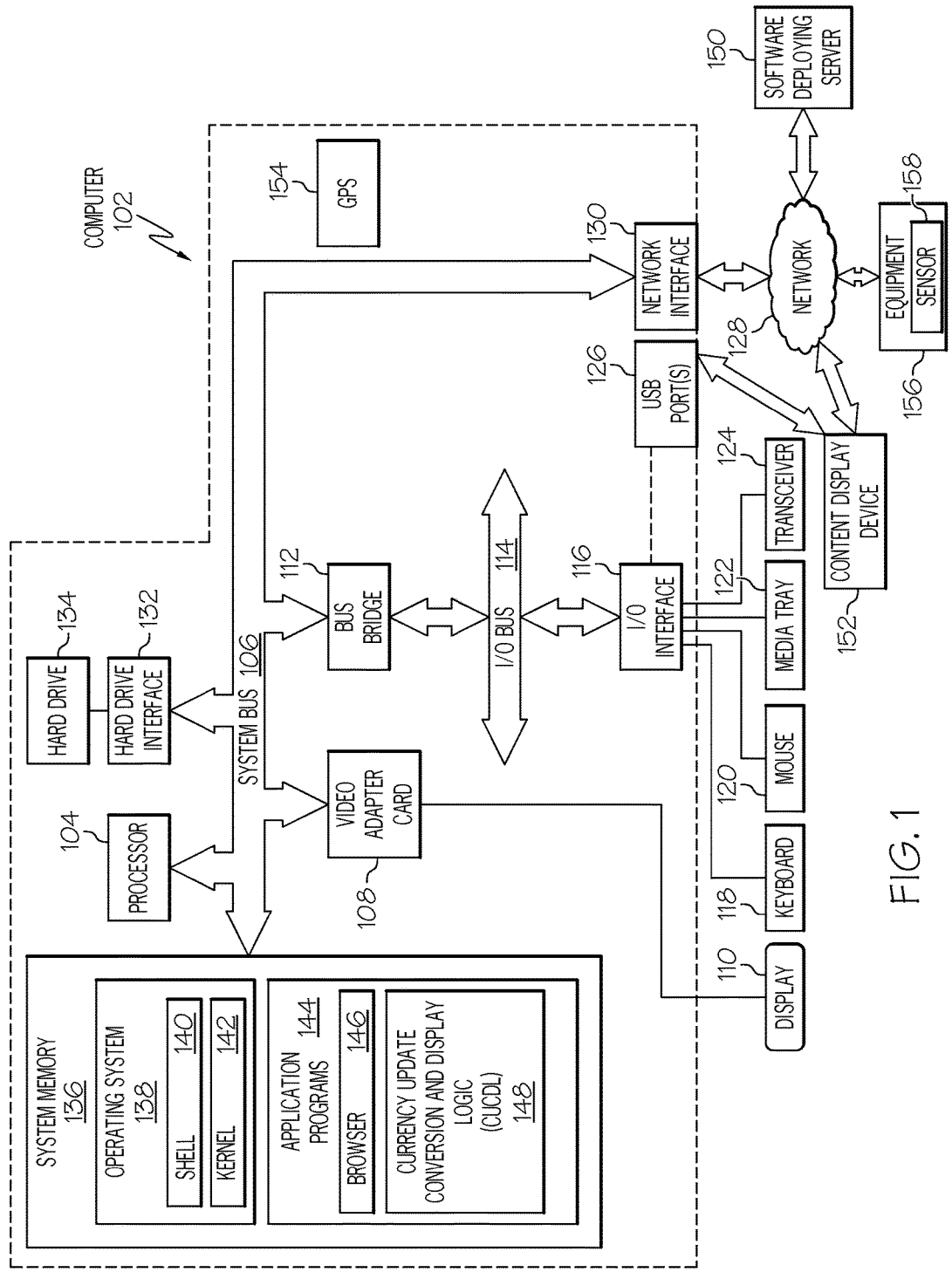
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150, content display device 152, and/or equipment 156.

Exemplary computer 102 includes a processor 104 that is coupled to a system bus 106. Processor 104 may utilize one or more processors, each of which has one or more processor cores. A video adapter card 108, which drives/supports a display 110, is also coupled to system bus 106. In one or more embodiments of the present invention, video adapter card 108 is a hardware video card. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a currency update conversion and display logic (CUCDL) 148. CUCDL 148 includes code for implementing the processes described below, including those described in FIGS. 2-3. In one embodiment, computer 102 is able to download CUCDL 148 from software deploying server 150, including in an on-demand basis, wherein the code in CUCDL 148 is not downloaded until needed for execution. Note further that, in one embodiment of the present invention, software deploying server 150 performs all of the functions associated with the present invention (including execution of CUCDL 148), thus freeing computer 102 from having to use its own internal computing resources to execute CUCDL 148.

In one or more embodiments of the present invention, computer 102 includes a geographic locator, such as a global positioning system (GPS) device 154 that utilizes signals from GPS satellites to determine the current geophysical/geographic position of the computer 102.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
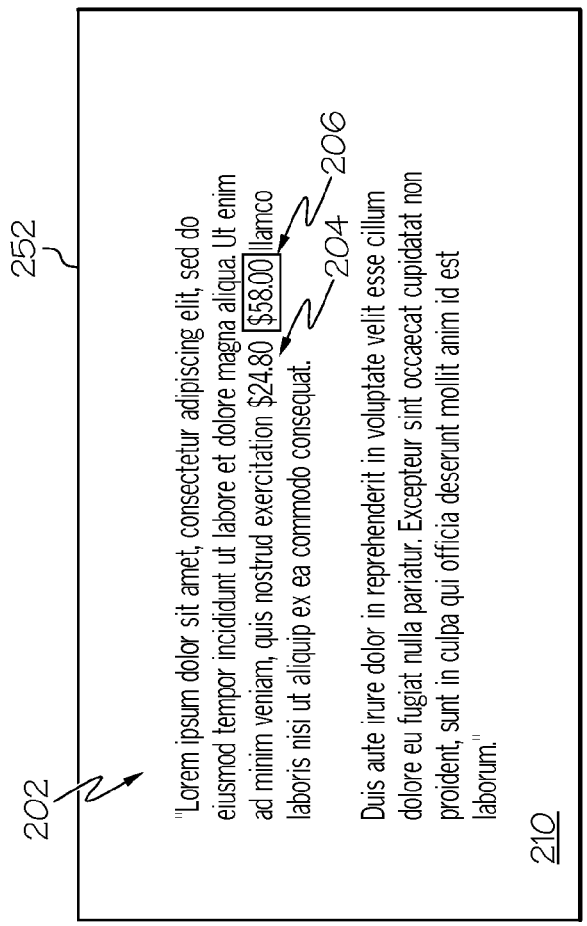
FIG. 2 illustrates an exemplary electronic display on which an electronic publication is displayed in accordance with one or more embodiments of the present invention.

With reference now to FIG. 2, a hardware display 210 (analogous to display 110 shown in FIG. 1) on a content display device 252 (analogous to content display device 152 in FIG. 1) presents a electronic publication 202 in accordance with one or more embodiments of the present invention. In various embodiments of the present invention, electronic publication 202 is a webpage, an electronic book (i.e., an e-book that is readable on an electronic display), an e-mail (assuming that an e-mail program is running on the content display device 252), etc.

Within the electronic publication 202 is a reference to a currency amount, shown for explanatory/exemplary purposes as an initial currency value of "$24.80" in sub-text 204. However, the currency value "$24.80" may or may not be antiquated when the electronic publication 202 is read/published/displayed at a time/date that is other than when the electronic publication 202 was written. That is, while "$24.80" may have been an accurate value for the context of the electronic publication 202 at the time that the electronic publication 202 was first written, "$24.80" may or may not be an accurate value when read within the time context when the electronic publication 202 is later published and/or provided on-line to readers.

For example, assume that electronic publication 202 is a textbook on economics that was written in 1980, and that the passage that includes "$24.80" (shown as sub-text 204) is "The minimum daily wage for an 8-hour day is $24.80, since the minimum wage is $3.10 per hour." If an assumption is made that the current minimum wage is $7.25 at the time that the electronic publication 202 is displayed to a user, then the passage is automatically updated by the present invention to augment electronic publication 202 with the secondary currency value "$58.00", as shown in sub-text 206. Thus, the passage now reads as "The minimum daily wage for an 8-hour day is $58.00, since the minimum wage is $7.25 per hour." In one embodiment and as depicted in FIG. 2, both sub-text 204 and sub-text 206 are depicted on the augmented version of the electronic publication 202, such that the value "$58.00" and the value "$24.80" both appear in the electronic publication 202. However, in another embodiment, the sub-text 206 replaces the sub-text 204, such that the value "$58.00" replaces the value "$24.80" in the electronic publication 202.

Figure 3:
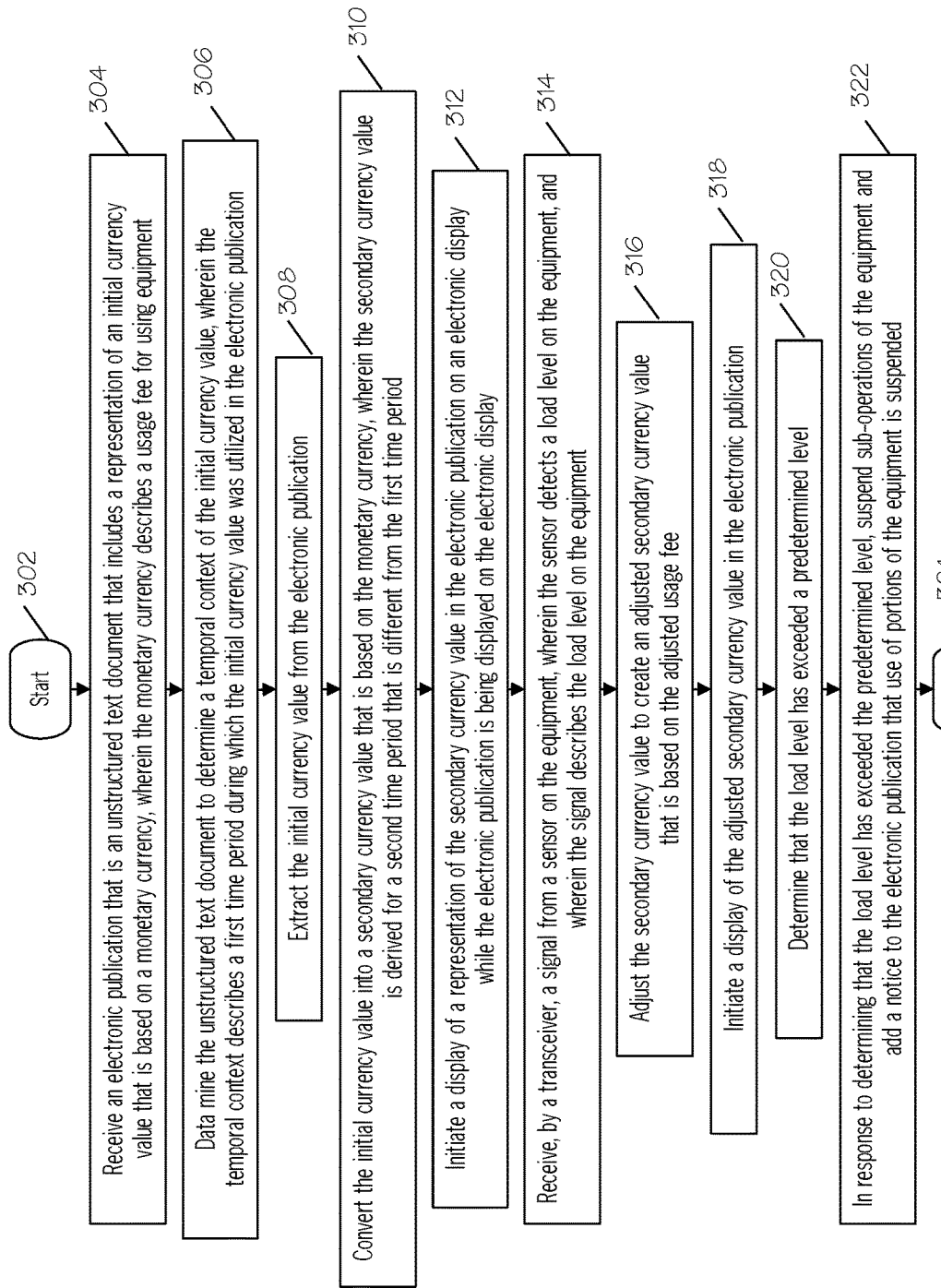
FIG. 3 is a high level flow-chart of one or more operations performed by one or more hardware devices to generate and display a secondary currency value derived from an initial currency value that is presented in an electronic publication on an electronic display.

With reference now to FIG. 3, a high level flow-chart of one or more operations performed by one or more hardware devices to generate and display a secondary currency value derived from an initial currency value that is presented in an electronic publication on an electronic display is presented.

After initiator block 302, a video adapter card (e.g., video adapter card 108 in FIG. 1) receives and displays an electronic publication on an electronic display (see FIG. 2), as described in block 304. The electronic publication is an unstructured text document. That is, the electronic publication is not a table, a spreadsheet, etc., from which times and scales are readily apparent, but rather is an unstructured document, such as a text document, a webpage showing pictures and captions, etc.

The unstructured electronic publication includes a representation (e.g., text entry) of an initial currency value that is based on a monetary currency. For example, in FIG. 2, the value $24.80 is the initial currency value (which is found in the original version of the electronic publication 202) of the U.S. dollar (the monetary currency).

As described in block 306 in FIG. 3, the processors data mine the unstructured text document to determine a temporal context of the initial currency value, where the temporal context describes a first time period during which the initial currency value was utilized in the electronic publication. For example, by examining the text within the electronic document, keywords such as "1980" may be found along with "minimum wage is", thus indicating that the value "$24.80" is temporally related (time-relevant) to the year 1980, and more specifically to what the minimum wage was in 1980 (thus leading to the value "$24.80").

As described in block 308, the processors extract the initial currency value (e.g., "$24.80") from the electronic publication, and convert it (block 310) into a secondary currency value (e.g., "$58.00") that is based on the monetary currency, where the secondary currency value is derived for a second time period that is different from the first time period.

The video adapter card then displays (block 312) a representation of the secondary currency value (e.g., "$58.00") in the electronic publication while the electronic publication is being displayed on the electronic display, as shown in an exemplary manner in FIG. 2.

The flow-chart ends at terminator block 324.

In one embodiment of the present invention, the second time period is after the first time period. For example, in FIG. 2, the value of "$58.00" may be for 2014 (the second time period), while the value of $24.80" may be for 1980 (the first time period).

In one embodiment of the present invention, the second time period is a current time period during which the representation of the secondary currency value is displayed in the electronic publication. That is, the time/date at which the electronic publication is being presented to a viewer sets the second time period. Thus, if the electronic publication is a webpage, then the value of the secondary currency value is set for whenever the webpage is provided to a browser used by the user.

In one embodiment of the present invention, the video adapter card displays both the initial currency value and the secondary currency value in the electronic publication (as shown in FIG. 2).

In another embodiment of the present invention, one or more processors replace the initial currency value (e.g., "$24.80") with the secondary currency value (e.g., "$58.00") in the electronic publication, such that only "$58.00", and not "$24.80", appears in the electronic document 202 shown in FIG. 2.

In one embodiment of the present invention, the secondary currency value (that augments and/or replaces the initial currency value in the electronic document) is tied to a commodity whose on-line (i.e., real time) price fluctuates at time intervals that are less than 1 second, thus requiring operations by a computer. In this embodiment, one or more processors generate a converted initial currency value by converting the initial currency value of the monetary currency to the secondary currency value of the monetary currency every time the on-line price of the commodity fluctuates. The video adapter card then updates a display of the electronic publication with the converted initial currency value.

For example, assume that the electronic publication is a webpage offering to sell an ounce of gold for $1,000.00. However, assume further that the price of gold fluctuates in real time every 20 milliseconds such that it has a value of $1,000.02 20 milliseconds after the electronic publication was first published on a website, a value of $999.97 20 milliseconds after that, a value of $1,000.03 20 milliseconds after that, etc. It is not possible for a human to update these prices due to the rapid changes in prices over such short time spans. Thus, the present invention keeps such values accurate for instantaneous times, such that if a webpage offered an ounce of gold at a certain exact moment (e.g., for $1,000.03), the offer must be accepted by another computer in less than 20 milliseconds in order to take advantage of this offer. Such response times are beyond the capability of a human. Thus, this embodiment is inextricably intertwined with the technology provided only by a computer system.

In one embodiment of the present invention, monetary currency is a first currency, and the secondary currency value is tied to a second currency whose on-line (i.e., real time) price relative to the first currency fluctuates at time intervals that are less than 1 second. In this embodiment, one or more processors generate a converted initial currency value by converting the initial currency value of the monetary currency to the secondary currency value of the monetary currency every time the on-line price of the second commodity fluctuates. The video adapter card updates a display of the electronic publication with the converted initial currency value.

For example, as in the example above in which pricing is based on a value of a commodity, this embodiment is tied to currency exchange rates. For example, assume that a product (e.g., a "widget"—an imaginary product used to represent any goods or services) is offered by an American company to a customer in Europe for €1.000 (euros), which at the time of the offer is $1.20 (US dollars). However, 20 milliseconds later $1.20 is worth €1.001. Thus, if a European customer's browser pulls up a webpage offering the widget 20 milliseconds after the webpage was initially posted, the webpage would offer the product to the European customer for €1.001. In order to take advantage of this price before it costs even more euros, the customer's computer must respond within 20 milliseconds, far faster than a response time capable of a human.

In one embodiment of the present invention, the monetary currency is for a first currency. A positioning device (e.g., GPS 154 shown in FIG. 1), which is coupled to the electronic display, generates a geophysical location of the electronic display at the second time period. One or more processors determine a local currency used at the geophysical location of the electronic display, and convert the secondary currency value of the first currency into a secondary currency value of the local currency. The video adapter card displays the secondary currency value of the local currency on the electronic publication while the electronic publication is being displayed on the electronic display.

For example, assume that an American supplier offers a "widget" for $1.00 US (US dollars) on a webpage. Assume further that a potential customer is using a computer in Mexico, where the currency is the Mexican peso (Mex$). Assume further that a US Dollar is worth 15 Mexican pesos.

In this example and according to this embodiment of the present invention, the GPS 154 determines that the customer is in Mexico. Based on this information, the webpage offer to sell one widget is automatically changed from "We will sell you one widget for $1.00 US" to "We will sell you one widget for Mex$15.00".

As with the embodiments in which pricing is tied to certain commodities that change too rapidly for a human to keep up with, in one embodiment the price exchange of one currency to another (e.g., USDollars to MexDollars) changes too rapidly for a human to reconfigure the electronic document. Furthermore, the system is technologically inextricably intertwined with the GPS system depicted as GPS 154.

In one embodiment of the present invention, the location of the user is determined by a context of communications from the user. For example, assume that a user has transmitted a message indicating a desire to purchase a widget for Mex$15.00. Based on the use of the term "Mex$15.00", an assumption is made that the user is in Mexico. Similarly, if the user transmits a message in Portuguese, then an assumption can be made that the user is in Brazil, as this is where Portuguese usage is most common.

In one embodiment of the present invention, one or more processors extract an encrypted electronic time and date watermark from the electronic publication, and then decrypt the encrypted electronic time and date watermark to determine the first time period during which the initial currency value was presented in the electronic publication. An encrypted electronic time and date watermark is defined as code that is embedded, in an encrypted form, into the electronic publication (e.g., document), and is discernable and readable only by a computer. That is, when displayed on a user's computer, the electronic document appears as an ordinary text document. However, embedded within the code that generates the text document is encrypted code, which describes when (i.e., the time and date) the document was generated. The only way for the time and date that the document was generated can be discerned is by a computer extracting this watermark from the document and decrypting it. This information is then used to convert the initial currency value to the secondary (e.g., current) currency value, as described herein.

In one embodiment of the present invention, the monetary currency is a usage fee for using equipment, as further described in block 304 in FIG. 3. In this embodiment, a transceiver (e.g., transceiver 124 in FIG. 1) receives a signal from a sensor on the equipment, where the sensor detects a load level on the equipment, and wherein the signal describes the load level on the equipment, as described in block 314 in FIG. 3. One or more processors adjust the usage fee to create an adjusted usage fee that is based on the load level, and then adjust the secondary currency value to create an adjusted secondary currency value that is based on the adjusted usage fee, as described in block 316 in FIG. 3. The video adapter card then displays the adjusted secondary currency value on the electronic publication, as described in block 318 in FIG. 3.

That is, rather than just changing a currency value presented in an electronic document based on the passage of time, this embodiment incorporates load usage of equipment to adjust the currency value. For example, if the electronic document is an offer to use storage space in a server farm to store data, the price of such data storage may fluctuate according to how much network bandwidth is being used by the server farm. If the bandwidth usage rises above a predetermined level, such that additional data requests/ stores will be slowed down, then the price of using such storage will be raised (in order to discourage additional customers at that time). This higher price will be reflected on an electronic document, such as a webpage or portal that offers data storage.

In one embodiment, if the load level of the equipment exceeds a predetermined level, as described in block 320 in FIG. 3, then one or more processors will suspend sub-operations of the equipment (in order to improve the overall operation of the equipment), and will add a notice to the electronic publication that sub-operations of the equipment are suspended, as described in block 322 in FIG. 3. That is, assume that the equipment being offered for lease is a power distribution station. If the load on the power distribution station exceeds a certain total wattage, then high-voltage trunk lines ("sub-operations") may be disabled, thereby protecting the overall power distribution station. The power distribution station may still supply low-voltage trunk lines (at a higher price, which is reflected in the electronic document, such as a portal offer for power), but the sensors (e.g., sensor 158) within the power distribution station (e.g., equipment 156) protect the power distribution station, both by increasing the charge for using the lower-voltage trunk lines (thereby reducing demand according to cost supply and demand pressures) and by shutting down the high-voltage trunk lines.

In one embodiment of the present invention, the electronic publication includes publication metadata that describes a publication date of the electronic publication. In this embodiment, one or more processors extract the publication metadata to determine the temporal context of the initial currency value. That is, a hardware device extracts electronic signals that represent metadata (e.g., descriptions of when the electronic publication was created), which the hardware device interprets/decodes to create a signal that represents when the electronic publication was first created. The system is then able to use this initial time to calculate the present value of the currency value.

In various embodiments of the present invention, determining the present value of currency described/depicted in the electronic document can be performed by tying the currency to a commodity/other currency (as described above), or such conversion can be provided in a lookup table that uses an accepted conversion impactor, such as inflation. That is, if inflation has been running at 5% per year for the past ten years, then a lookup table can convert the currency amount for an electronic document created in 2005 into an equivalent currency amount in 2015 (adjusted for inflation).

In one embodiment of the present invention, a device includes a display (e.g., display 110 shown in FIG. 1), one or more processors (e.g., processor 104 shown in FIG. 1), and a video adapter card (e.g., video adapter card 108 shown in FIG. 1). As described herein, the display is used to present/display an electronic publication, which is an unstructured text document that includes a representation of an initial currency value that is based on a monetary currency. The processors data mine the unstructured text document to determine a temporal context of the initial currency value, where the temporal context describes a first time period during which the initial currency value was utilized in the electronic publication. The processors extract the initial currency value from the electronic publication, and convert the initial currency value into a secondary currency value that is based on the monetary currency, where the secondary currency value is derived for a second time period that is different from the first time period.

For example, assume that the initial currency value reflected the cost of using equipment at a certain time/date. The time may be cyclic or on-off. That is, the cost may fluctuate according to a time of day or a day of the week, or it may change over long periods of time according to inflationary pressure, etc.

Thus, if the electronic publication is an offer (e.g., through a webpage, an e-mail, etc.) to use certain hardware equipment, the present invention will automatically adjust the pricing of such usage according to when the electronic publication is presented to a potential customer.

In accordance with one or more embodiments of the present invention, the transceiver (e.g., transceiver 124 shown in FIG. 1) receives a signal from a sensor (e.g., sensor 158 shown in FIG. 1) on a unit of equipment (e.g., equipment 156). The sensor detects a load level on the equipment, and the signal describes the load level on the equipment.

For example, assume that the equipment is a server. The sensor may detect what percentage of CPU, bus, network, etc. bandwidth is being consumed at any point in time.

In another example, assume that the equipment is a fluid pump, and the sensor detects what percentage of maximum capacity (e.g., gallons per second) that the fluid pump is operating at when pumping fluid such as crude oil, chemicals, water, etc.

In another example, assume that the equipment is a hydraulic lift (e.g., a crane or a car lift), and the sensor detects what percentage of the maximum lifting capacity (e.g., in tons) the hydraulic lift is lifting in real time.

In these and other embodiments, the system determines what amount of capacity is being utilized by the hardware equipment 156 based on readings from the sensor 158. Based on these readings, one or more processors adjust the initial usage fee to create an adjusted usage fee that is based on the load level. Thus, the present invention is dependent on electronic signals from sensor 158 to create the adjusted usage fee.

The processors thus adjust the secondary currency value to create an adjusted secondary currency value that is based on the adjusted usage fee, and the display displays the adjusted secondary currency value in the electronic publication.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving, by one or more processors, an electronic publication, wherein the electronic publication is an unstructured text document that includes a representation of an initial currency value that is based on a monetary currency, wherein the monetary currency describes a usage fee for using equipment;
   data mining, by one or more processors, the unstructured text document to determine a temporal context of the initial currency value, wherein the temporal context describes a first time period during which the initial currency value was utilized in the electronic publication;
   extracting, by one or more processors, the initial currency value from the electronic publication;
   converting, by one or more processors, the initial currency value into a secondary currency value that is based on the monetary currency, wherein the secondary currency value is derived for a second time period that is different from the first time period;
   initiating a display, by one or more processors, of a representation of the secondary currency value in the electronic publication on an electronic display while the electronic publication is being displayed on the electronic display;
   receiving, by a transceiver, a signal from a sensor on the equipment, wherein the sensor detects a load level on the equipment, and wherein the signal describes the load level on the equipment;
   adjusting, by one or more processors, the usage fee to create an adjusted usage fee that is based on the load level;
   adjusting, by one or more processors, the secondary currency value to create an adjusted secondary currency value that is based on the adjusted usage fee;
   initiating a display, by one or more processors, of the adjusted secondary currency value in the electronic publication;
   determining, by one or more processors, that the load level has exceeded a predetermined level; and
   in response to determining that the load level has exceeded the predetermined level, one or more processors suspending sub-operations of the equipment and adding a notice to the electronic publication that use of portions of the equipment is suspended.

2. The method of claim 1, wherein the second time period is after the first time period.

3. The method of claim 1, wherein the second time period is a current time period during which the representation of the secondary currency value is displayed in the electronic publication.

4. The method of claim 1, further comprising:
   initiating a display, by one or more processors, of both the initial currency value and the secondary currency value in the electronic publication.

5. The method of claim 1, further comprising:
   replacing, by one or more processors, the initial currency value with the secondary currency value in the electronic publication.

6. The method of claim 1, wherein the secondary currency value is tied to a commodity whose real time price fluctuates at time intervals that are less than 1 second, and wherein the method further comprises:
   generating, by one or more processors, a converted initial currency value by converting the initial currency value of the monetary currency to the secondary currency value of the monetary currency every time the real time price of the commodity fluctuates; and
   updating, by one or more processors, a display of the electronic publication with the converted initial currency value.

7. The method of claim 1, wherein the monetary currency is a first currency, wherein the secondary currency value is tied to a second currency whose real time price relative to the first currency fluctuates at time intervals that are less than 1 second, and wherein the method further comprises:
   generating, by one or more processors, a converted initial currency value by converting the initial currency value of the monetary currency to the secondary currency value of the monetary currency every time the real time price of the second currency fluctuates; and
   updating, by one or more processors, a display of the electronic publication with the converted initial currency value.

8. The method of claim 1, wherein the monetary currency is for a first currency, and wherein the method further comprises:
   receiving, from a positioning device coupled to the electronic display, a geophysical location of the electronic display at the second time period, wherein the positioning device is a global positioning system (GPS) based positioning device;

determining, by one or more processors, a local currency used at the geophysical location of the electronic display;

converting, by one or more processors, the secondary currency value of the first currency into a secondary currency value of the local currency; and initiating a display, by a video adapter card, of the secondary currency value of the local currency on the electronic publication while the electronic publication is being displayed on the electronic display.

9. The method of claim 1, further comprising:

extracting, by one or more processors, an encrypted electronic time and date watermark from the electronic publication; and decrypting, by one or more processors, the encrypted electronic time and date watermark to determine the first time period during which the initial currency value was presented in the electronic publication.

10. The method of claim 1, wherein the electronic publication includes publication metadata that describes a publication date of the electronic publication, and wherein the method further comprises:

extracting, by one or more processors, the publication metadata to determine the temporal context of the initial currency value.

11. A computer program product comprising a computer readable storage medium having program code embodied therewith, wherein the computer readable storage medium is not a transitory signal per se, and wherein the program code is readable and executable by a processor to perform a method comprising:

receiving an electronic publication, wherein the electronic publication is an unstructured text document that includes a representation of an initial currency value that is based on a monetary currency, wherein the monetary currency is a usage fee for using equipment;

data mining the unstructured text document to determine a temporal context of the initial currency value, wherein the temporal context describes a first time period during which the initial currency value was utilized in the electronic publication;

extracting the initial currency value from the electronic publication;

converting the initial currency value into a secondary currency value that is based on the monetary currency, wherein the secondary currency value is derived for a second time period that is different from the first time period;

displaying a representation of the secondary currency value in the electronic publication on an electronic display while the electronic publication is being displayed on the electronic display;

receiving a signal from a sensor on the equipment, wherein the sensor detects a load level on the equipment, and wherein the signal describes the load level on the equipment;

adjusting the usage fee to create an adjusted usage fee that is based on the load level;

adjusting the secondary currency value to create an adjusted secondary currency value that is based on the adjusted usage fee;

displaying the adjusted secondary currency value in the electronic publication;

determining that the load level has exceeded a predetermined level; and in response to determining that the load level has exceeded the predetermined level, suspending operation of the equipment and adding a notice to the electronic publication that use of the equipment is suspended.

12. The computer program product of claim 11, wherein the method further comprises:

displaying both the initial currency value and the secondary currency value in the electronic publication.

13. The computer program product of claim 11, wherein the method further comprises:

replacing the initial currency value with the secondary currency value in the electronic publication.

14. The computer program product of claim 11, wherein the secondary currency value is tied to a commodity whose real time price fluctuates at time intervals that are less than 1 second, and wherein the method further comprises:

generating a converted initial currency value by converting the initial currency value of the monetary currency to the secondary currency value of the monetary currency every time the real time price of the commodity fluctuates, wherein the real time price is generated every 20 milliseconds; and updating a display of the electronic publication with the converted initial currency value.

15. The computer program product of claim 11, wherein the monetary currency is a first currency, wherein the secondary currency value is tied to a second currency whose real time price relative to first currency fluctuates at time intervals that are less than 1 second, and wherein the method further comprises:

generating a converted initial currency value by converting the initial currency value of the monetary currency to the secondary currency value of the monetary currency every time the real time price of the second currency fluctuates, and wherein the initial currency value is converted into the secondary currency value every second; and updating a display of the electronic publication with the converted initial currency value.

16. The computer program product of claim 11, wherein the monetary currency is for a first currency, and wherein the method further comprises:

receiving a geophysical location of the electronic display at the second time period;

determining a local currency used at the geophysical location of the electronic display;

converting the secondary currency value of the first currency into a secondary currency value of the local currency; and displaying the secondary currency value of the local currency on the electronic publication while the electronic publication is being displayed on the electronic display.

17. The computer program product of claim 11, wherein the equipment is a fluid pump, wherein the sensor detects that a maximum capacity of the fluid pump, as measured in gallons per second that the fluid pump is currently pumping, is being exceeded, and wherein said suspending operation of the equipment is performed by the processor turning off the fluid pump.

18. A device comprising:

a display for displaying an electronic publication, wherein the electronic publication is an unstructured text document that includes a representation of an initial currency value that is based on a monetary currency, wherein the monetary currency is a usage fee for using equipment;

one or more processors for data mining the unstructured text document to determine a temporal context of the initial currency value, wherein the temporal context describes a first time period during which the initial currency value was utilized in the electronic publication;

one or more processors for extracting the initial currency value from the electronic publication;

one or more processors for converting the initial currency value into a secondary currency value that is based on the monetary currency, wherein the secondary currency value is derived for a second time period that is different from the first time period;

a transceiver for receiving a signal from a sensor on equipment, wherein the sensor detects a load level on the equipment, and wherein the signal describes the load level on the equipment;

one or more processors for adjusting the usage fee to create an adjusted usage fee that is based on the load level;

one or more processors for adjusting the secondary currency value to create an adjusted secondary currency value that is based on the adjusted usage fee, wherein the display displays the adjusted secondary currency value in the electronic publication;

a receiver for receiving a signal from a sensor on the equipment, wherein the sensor detects a load level on the equipment, and wherein the signal describes the load level on the equipment;

one or more processors for adjusting the usage fee to create an adjusted usage fee that is based on the load level;

one or more processors for adjusting the secondary currency value to create an adjusted secondary currency value that is based on the adjusted usage fee;

one or more processors for displaying the adjusted secondary currency value in the electronic publication;

one or more processors for determining that the load level has exceeded a predetermined level; and one or more processors for, in response to determining that the load level has exceeded the predetermined level, suspending operation of the equipment and adding a notice to the electronic publication that use of the equipment is suspended.

\* \* \* \* \*